United States Patent [19]

Lengsfeld et al.

[11] Patent Number: 4,703,841
[45] Date of Patent: Nov. 3, 1987

[54] ADJUSTABLE ELECTROMAGNETIC CLUTCH BRAKE

[75] Inventors: Karl Lengsfeld, Plankstadt; Erich Link, Brühl; Hans Erndt, Wiesloch, all of Fed. Rep. of Germany

[73] Assignee: Frankl & Kirchner GmbH Co KG Fabrik für Elektromotoren u. Elektrische Apparate, Schwetzingen/Baden, Fed. Rep. of Germany

[21] Appl. No.: 768,563

[22] Filed: Aug. 23, 1985

Related U.S. Application Data

[62] Division of Ser. No. 402,351, Jul. 27, 1982, Pat. No. 4,556,132.

[30] Foreign Application Priority Data

Aug. 4, 1981 [DE] Fed. Rep. of Germany ....... 3130819

[51] Int. Cl.⁴ ...................... B60K 41/24; F16D 13/75
[52] U.S. Cl. ................. 192/12 BA; 192/110 R; 192/111 B
[58] Field of Search ............... 192/111 R, 12 D, 18 B, 192/110 R, 110 B, 111 B, 18 R; 310/76, 77, 78

[56] References Cited

U.S. PATENT DOCUMENTS 3,253,686  5/1966  Scheuerer ................... 192/18 R
3,493,796  2/1970  Siegel ...................... 310/76
3,750,781  8/1973  Lengsfeld ................. 192/18 B

FOREIGN PATENT DOCUMENTS 749148  12/1966  Canada .
2231501  1/1974  Fed. Rep. of Germany .

Primary Examiner—George H. Krizmanich
Attorney, Agent, or Firm—Browdy and Neimark

[57] ABSTRACT

An electromotive control drive mechanism, in particular for industrial sewing machines, comprises a continuously drivable motor and a brake/clutch unit connected therewith. A clutch disk connected in a rotationally fixed manner with a driven shaft can, by axial movement and by overcoming a clutch air gap, be brought into frictional engagement with a clutch support which is connected in a rotationally fixed manner with the rotor of the motor. A brake disk connected in a rotationally fixed manner with the driven shaft can be brought into frictional engagement with a brake support which is rotationally fixed. A clutch coil and a brake coil are also provided. In order to reduce the expense of the brake/clutch unit without burdensome actuation noises arising, only one clutch/brake disk is provided, and mechanisms are provided for adjusting the clutch air gap and the automatic readjustment of the clutch air gap.

4 Claims, 7 Drawing Figures

ADJUSTABLE ELECTROMAGNETIC CLUTCH BRAKE

This is a division of parent co-pending application Ser. No. 402,351, filed July 27, 1982, now U.S. Pat. No. 4,556,132.

FIELD OF THE INVENTION

The present invention relates to an electromotive control drive mechanism, in particular for industrial sewing machines, comprising a continuously drivable motor and a brake/clutch unit connected with the motor. A clutch disk is connected in a rotationally fixed manner with a driven shaft and, by moving axially and overcoming a clutch air gap, can be brought into frictional engagement with a clutch support, which is connected in a rotationally fixed manner with the rotor of the motor. A brake disk is also connected in a rotationally fixed manner with the driven shaft and can be brought into frictional engagement with a rotationally fixed brake support. The mechanism includes a clutch coil and a brake coil.

BACKGROUND OF THE INVENTION

The brake/clutch unit of the well-known drive mechanism of the general type described above has a separate brake disk and clutch disk, which can be brought into frictional engaement, independently of one another, with the brake support and clutch support, respectively. The clutch and brake disks are either rigid in embodiment and displaceable on the driven shaft by means of a gear, or else axially resilient in embodiment and firmly connected with the driven shaft in the axial direction. Providing two such disks is expensive in terms of money as well as of manufacturing and construction effort and requires increased space. Since drive mechanisms of this kind are actuated extremely frequently—up to 30,000 operations comprising clutch engagement and braking occur in the course of one 8-hour shift—it is particularly important to minimize the noises associated with these actuations.

DISCUSSION OF PRIOR ART

An electromagnetically actuatable clutch/brake assembly is known from German laid-open application DE-OS No. 22 31 501, in which a clutch disk is disposed on a driven shaft such that it is rotationally fixed but axially displaceable. On one side, the disk has a clutch lining, and upon the excitation of a clutch magnet the disk can be brought into engagement with a rotating clutch support, for instance the flywheel mass of a motor. On its other side, the clutch disk is provided with a brake lining, and when the clutch magnets are not excited the brake lining is brought into engagement, by means of pre-stressed springs, with a brake support which is attached to the housing. An embodiment of this kind is not suitable for a control drive mechanism of the general type described at the outset, because regulated braking is not possible. Furthermore, this embodiment is again associated with a substantial amount of actuation noise.

An electromotive control drive mechanism of the general type discussed at the outset is known from Canadian Pat. No. 749,148. Here the clutch coil and brake coil are both disposed in an outer bearing bracket which serves simultaneously as the clutch bearing bracket and the brake bearing bracket.

SUMMARY OF THE INVENTION

It is accordingly the object of the invention to embody a drive mechanism of the general type discussed above such that the expense of the brake/clutch unit is reduced without burdensome actuation noises occurring.

This object is attained by the invention in that one common clutch/brake disk is provided, which assures that when the clutch is engaged the brake will always be released at the same time. The opportunity of adjusting the clutch air gap assures that the shifting distances and thus the noises of impact when the clutch is being engaged will be quite limited. It is possible to adjust a clutch air gap between the clutch lining and the clutch face on the clutch support to a dimension of approximately 0.1 mm.

Another object of the invention is to assure that variations in the width of the clutch air gap during operation, caused for example by thermally dictated expansion of the clutch lining, are automatically compensated for.

The invention teaches a basic principle by which the adjustment of the clutch air gap is accomplished in a particularly advantageous manner.

According to another object of the invention, it is attained that the adjustment of the clutch air gap can be accomplished from outside the mechanism.

According to yet another object, an opportunity is provided for adjusting the clutch air gap in one of the two basic types of clutch/brake units discussed at the outset above.

Still another object permits adjusting the gap between the brake lining and the brake support, or in other words of adjusting the force with which the brake lining, in its position of rest, presses against the brake support.

According to a further object, the invention achieves readjustment of the clutch air gap during operation.

To achieve other objects, the invention teaches numerous structure arrangements for adjusting the clutch air gap, and several variants of means for clutch readjustment and brake adjustment.

One form of the invention has only a single adjusting device, is structurally inexpensive, easy to service and easy to manipulate. Because of the flat spring characteristic curve, the clutch/brake disk presses with a virtually constant force against the brake support when the brake coil is not excited, regardless of the setting of the clutch air gap.

Further advantages and characteristics of the invention will become apparent from the ensuing detailed description of some preferred exemplary embodiments, taken in conjunction with the drawings.

DESCRIPTION OF THE PREFERRED EMBODIMENTS

Figure 1:
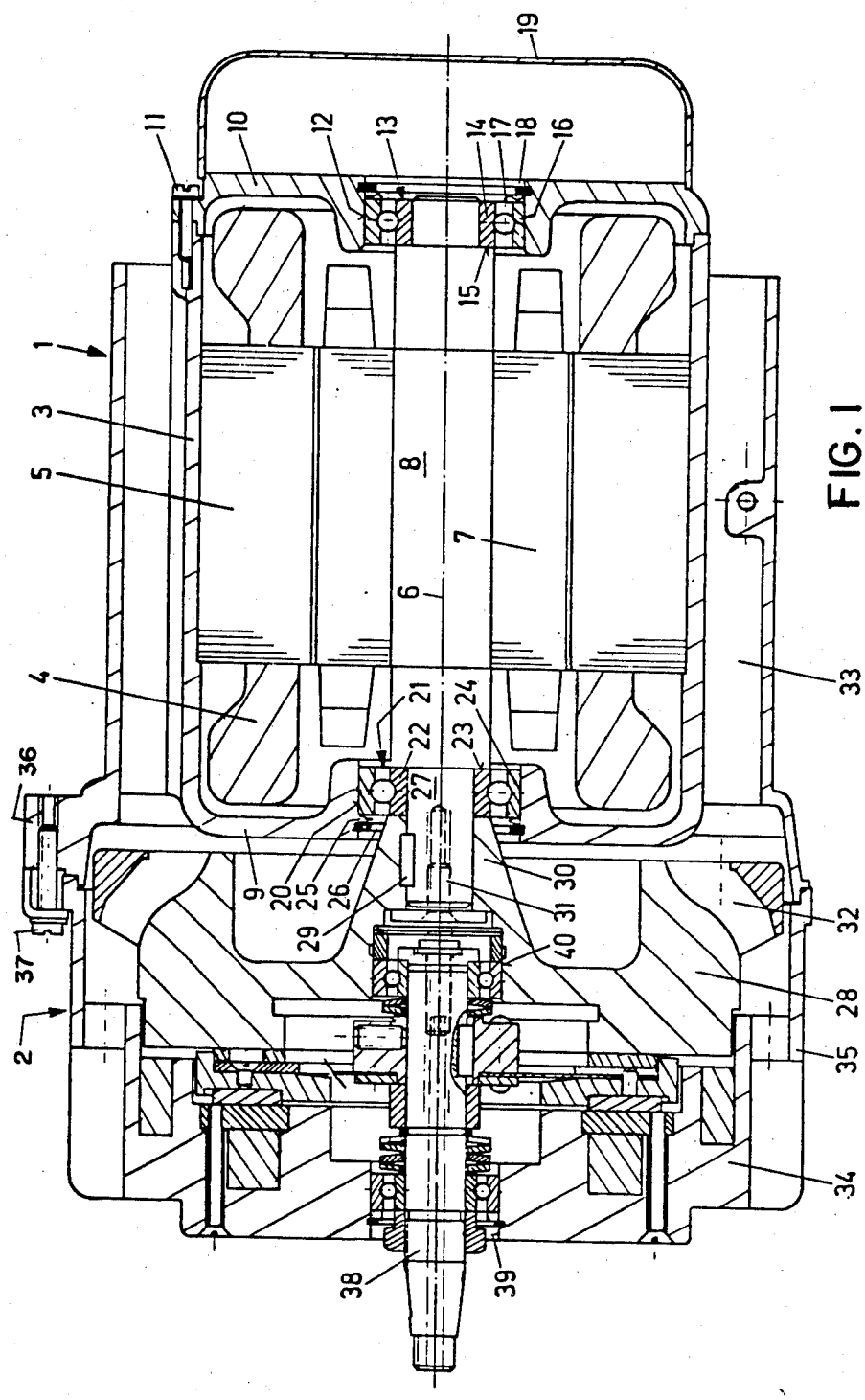
FIG. 1 shows a drive mechanism according to the present invention, comprising a motor and a brake/clutch unit, seen in an axial longitudinal section.

The drive mechanism shown in the drawings comprises a motor 1 and a brake/clutch unit 2 disposed rearwardly of the motor. The motor 1 has a substantially cylindrical stator housing 3, in which a stator made up of stator windings 4 and a stator lamination packet 5 is concentrically disposed in the conventional manner. A rotor 7, which is mounted on a motor shaft 8, is also disposed concentrically with respect to the central longitudinal axis 6. The motor shaft 8 is supported in bearing brackets 9, 10. The forward bearing bracket 10, i.e. the bearing bracket remote from the brake/clutch unit 2 is releasably secured to the stator housing 3 by means of screws 11. The motor shaft 8 is supported in the bearing bore 12 of the bearing bracket 10 by means of a rolling bearing 13, in this case an axial ball bearing; the inner ring 14 of the rolling bearing 13 is supported on its rear end by a collar 15 of the motor shaft 8. On the forward end, the outer ring 16 of the rolling bearing 13 is supported via an annular spring 17 against a fastening ring 18 fixed within the bearing bore 12, so that on the one hand the rolling bearing 13 is secured against axial movement on the motor shaft 8, yet on the other hand, axial readjustment movements of the motor shaft 8 are possible to the extent of the play predetermined by the annular spring 17. The forward bearing bracket 10 and in particular its bearing bore 12 are capped by a covering hood 19.

The rearward bearing bracket 9, adjacent to the brake/clutch unit 2, is embodied in one piece with the stator housing 3, as a result of which the stator housing 3 is cup-shaped. In the bearing bore 20 of this bearing bracket 9, the motor shaft 8 is again supported via a rolling bearing 21 embodied as an axial ball bearing, and here again the inner ring 22 of the rolling bearing 21 rests against a collar 23 of the motor shaft 8, while the outer ring 24 of the rolling bearing 21 is supported on the rear side, that is, the side oriented toward the brake/clutch unit 2, via an annular spring 25 against a fastening ring 26 fixed within the bearing bore 20. On the shaft tang 27 of the motor shaft 8 on which the rolling bearing 21 is disposed, a disk flywheel 28 is also fixed in position in a rotationally fixed manner by means of a tongue-and-groove connection 29. The disk flywheel 28 rests with the forward portion of its hub 30 against the rearward face of inner ring 22 of the rolling bearing 21 and is axially clamped firmly against the inner ring 22 by means of a screw connection 31, as a result of which it is simultaneously fixed axially with respect to the motor shaft 8. The disk flywheel 28 is embodied as a fan in its radially outer portion; to this end, it has fan blades 32, which aspirate cooling air rearwardly through an annular conduit 33 disposed around the stator housing 3, simultaneously cooling the stator housing 3, and blows the air rearwardly past a brake bearing bracket 34 which is also to be cooled.

The brake/clutch unit 2 has an approximately cylindrical housing 35, which is embodied in one piece with the brake bearing bracket 34, so that this housing 35 is again cup-shaped in general. It is releasably secured by means of screws 37 to a corresponding flange 36 on the rear end of stator housing 3. A driven shaft 38 disposed coaxially with respect to the central longitudinal axis 6 is supported at a rearward end in a bearing bore 39 of the brake bearing bracket 34 and at the forward end in a bearing bore 40 in the disk flywheel 28, being freely rotatable with respect to the disk flywheel 28. As is shown more specifically in FIG. 2, the driven shaft 38 is also supported, via respective rolling bearings 41, 42 embodied as axial ball bearings, in the bearing bores 39, 40. A clutch/brake disk 43 for effecting brake and clutch functions is fixed on the driven shaft 38 in a rotationally fixed manner between the rolling bearings 41, 42 by means of a tongue-and-groove connection. The clutch/brake disk 43 has a hub 45, which is connected in a rotationally fixed manner as shown with the driven shaft 38, and a radially outer armature ring 46, which is connected with the hub 45 by means of a radially extensive, axially resilient spider 47. An embodiment of this kind is known from German Pat. No. 16 25 715 (corresponding to U.S. Pat. No. 3,543,901). The axial fixation of the hub 45 will be discussed again further below.

On the forward side of the armature ring 46 (i.e., oriented toward the disk flywheel 28), an annular friction lining serving as a clutch lining 48 is secured, for instance by gluing, on the armature ring 46 or on the forwardly facing portion of the spider 47 oriented toward the armature ring 46. A corresponding annular clutch face 49 on the rearwardly facing end face of the disk flywheel 28 faces, and is aligned with, the clutch lining 48. The armature ring 46 has on its outer circumference an annular strut 50 protruding axially with respect to the disk flywheel 28. The annular strut 50 extends as far as the disk flywheel 28 with a slight axial gap "a" of only a few tenths of a millimeter between the forward end face of strut 50 and the corresponding rear surface of disk flywheel 28.

The brake bearing bracket 34 has a clutch coil housing 51, having a forward portion which radially surrounds the armature ring 46 with a narrow radial gap b, again only a few tenths of a millimeter in width, and with a annular housing strut 52 located radially outwardly of the forward portion, surrounds a rearward portion of the disk flywheel 28, again leaving a narrow gap, between corresponding facing surfaces of strut 52 and disk flywheel 28, of only a few tenths of a millimeter in width. An annular electromagnetic clutch coil 53 is disposed in the clutch coil housing 51 of the stationary brake bearing bracket 34. When this clutch coil 53 is excited, a magnetic path 54 from the clutch coil housing 51 and passing through the annular strut 50 of the armature ring 46, the disk flywheel 28 and the housing strut 52 and back to the clutch coil housing 51 is closed; as a result, the clutch/brake disk 43 is pressed with its clutch lining 48 against the clutch face 49 of the disk flywheel 28, which in this respect serves as a clutch disk.

On the clutch/brake disk 43, at the rearward side (remote from the disk flywheel 28), the armature ring 46 is provided with a friction lining serving as a brake lining 55, which is secured to the armature ring 46 by gluing or the like. Associated with, and facing, brake lining 55, it in the brake bearing bracket 34, is an annular brake support 56, which is secured to a forward region of the brake bearing bracket 34 by means of screws 57. The brake support 56 is made of a nonmagnetic material. A brake coil housing 58 is embodied in the brake bearing bracket 34 in the vicinity of the brake support 56, and an annular electromagnetic brake coil 59 is located in the brake coil housing and is covered on the forward side of clutch/brake disk 43 by the brake support 56. Upon excitation of the brake coil 59, a magnetic path 60 is formed which, beginning at the brake coil housing 58, passes via the part of the clutch coil housing 51 radially surrounding the armature ring 46, the annular strut 50 of the armature ring 46, and the armature ring itself, back to the brake coil housing 58 and draws the clutch/brake disk 43 with its brake lining 55 against the brake support 56. Since the brake support 56 is made of nonmagnetic material, it is not penetrated by the magnetic path 60. The armature ring 46 and the brake bearing bracket 34, which is embodied in one piece with the clutch coil housing 51 and the brake coil housing 58, are made of magnetic material, either alloyed or unalloyed iron. The disposition of the clutch coil 53 and the brake coil 59 and the associated magnetic poles in a common housing which also serves as the brake bearing bracket 34 and as the clutch bearing bracket as well, was accomplished such that as a result of the excitation of one magnetic circuit, the other magnetic circuit is not affected in any way that could have a disadvantageous effect on the regulating circuits subsequent to it in the system. This embodiment furthermore presents great advantages in terms of cost and space requirements.

The radially outer ring 61 of the annular rolling bearing 41 supported in the brake bearing bracket 34 is axially fixed at its rearward side by means of a fastening ring 62 fixed within the bearing bore 39. The radially inner ring 63 of the rolling bearing 41 rests at its rearward side against an adjusting nut 65 threaded from the rearward side of brake bearing bracket 34 onto a thread 64 of the driven shaft 38. At its forward side (i.e., the side oriented toward the clutch/brake disk 43), the inner ring 63 of rolling bearing 41 is supported via elastic members, for instance plate springs 66, against a fastening ring disposed on the driven shaft 38 and serving as an axially fixed stop 67. These elements together make up a brake adjustment device 68.

The hub 45 is supported at its rearward end by a spacer sleeve 69, the latter abutting, at its rearward end, against the stop 67.

The radially inner ring 70 of the rolling bearing 42 supported in the disk flywheel 28 is supported at its rearward end via an elastic member, as for example plate springs 71, against the hub 45 and at its forward end against a support 72, which is axially held and adjusted relative to the driven shaft 38 by means of a coaxially disposed adjusting screw 73. Screw 73 is disposed in a through bore 74 in the driven shaft and can be rotated from the outside by means of a screwdriver or an Allen wrench, thereby permitting axial adjustment of support 72. This embodiment makes up a clutch adjustment device 75.

The radially outer ring 76 of the rolling bearing 42 on its rearward end (i.e., the end facing clutch/brake disk 43); the forward end of outer ring 76 rests via a support ring 77 against a readjusting member 78, in this case a bimetallic member. This latter element in turn is supported by the bottom (i.e., the forward surface) of the associated bearing bore 40.

By appropriately rotating the adjusting nut 65, the driven shaft 38 may be moved forwardly or rearwardly relative to, and through, the brake bearing bracket 34. In other words by the appropriate actuation of the brake adjustment device 68, the axial position of the driven shaft 38, and thus the axial position of the clutch/brake disk 43 axially fixed onto the driven shaft 38, may be adjusted relative to the brake bearing bracket 34. As a result, the air gap between the brake lining 55 and the brake support 56 when the brake coil 59 is unexcited may be chosen and fixed. The air gap between the clutch face 49 and the clutch lining 48 when the clutch coil 53 is unexcited is adjusted by means of the rotation of the adjusting screw 73, or in other words by actuating the clutch adjustment device 75. The brake air gap is generally zero when there is a slight pressure force being exerted.

As the disk flywheel 28 warms up, the readjustment member 78, that is, the bimetallic ring, assumes a curvature such that its outer rim deflects rearwardly (i.e., toward the brake bearing bracket 34) and that the support ring 77, and thus the outer ring 76 of the rolling bearing 42, are deflected relative to the disk flywyeel 28 and pushed rearwardly (i.e., in a direction away from motor housing 1). Since the rolling bearing 42 is stationary with respect to the hub 45, the disk flywheel 28 is therefore displaced forwardly together with the motor shaft 8, that is, in a direction toward the remote bearing bracket 10. This is possible because the two outer rings 16 and 24 of the two rolling bearings 13, 21 are supported in a resilient manner via the annular springs 17 and 25, respectively. Naturally the spring force of the plate springs 71 must be greater than the spring force of the annular springs 17 and 25. In this manner, the air gap between the clutch lining 48 and the clutch face 49 of the disk flywheel 28 is held approximately constant, since given the continuous contact of the clutch lining 48 against the disk flywheel 28, heating occurs and causes the readjustment movement described above.

Figure 2:
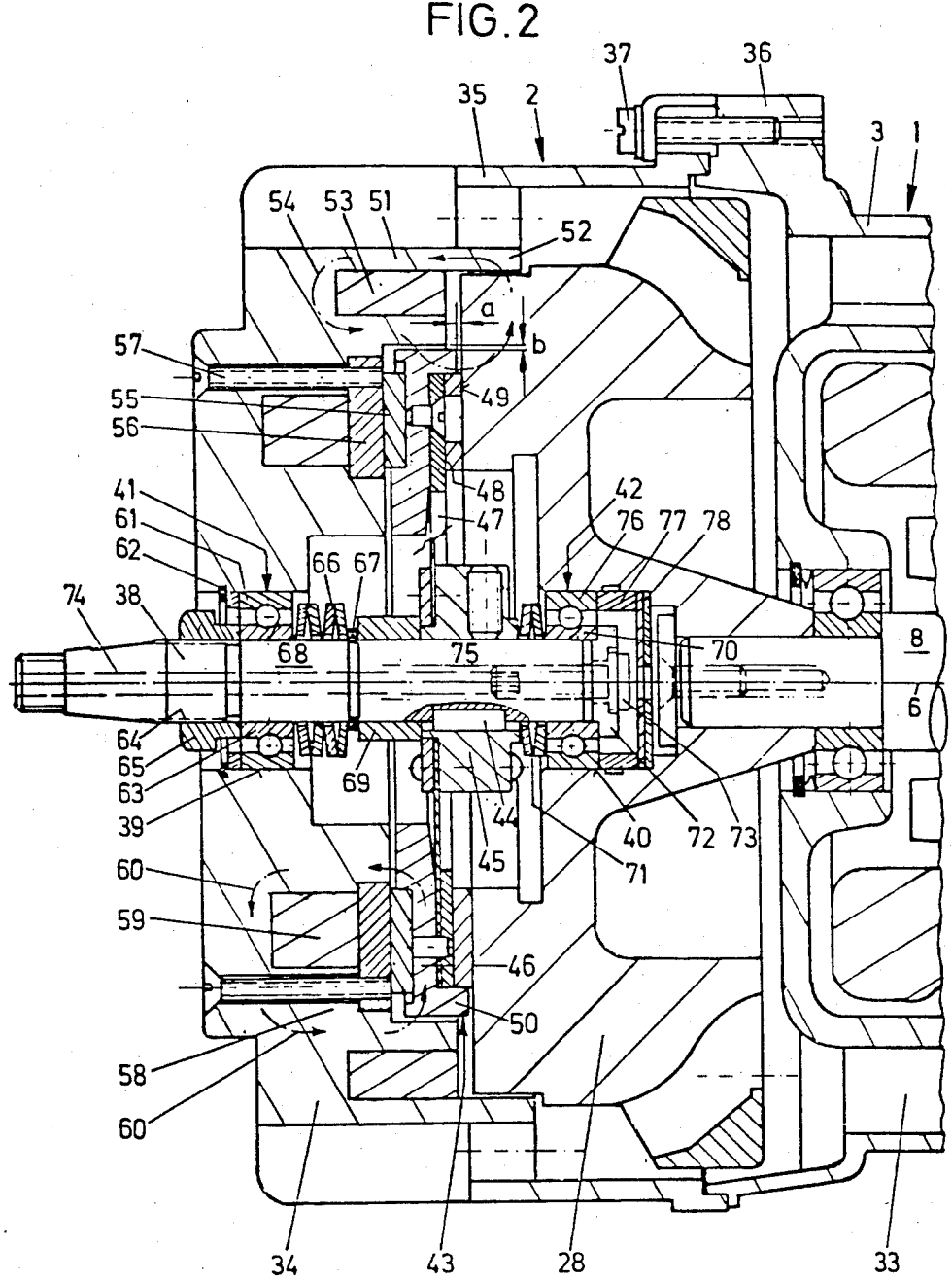
FIG. 2 shows the clutch/brake unit of FIG. 1 on an enlarged scale.
Figure 3:
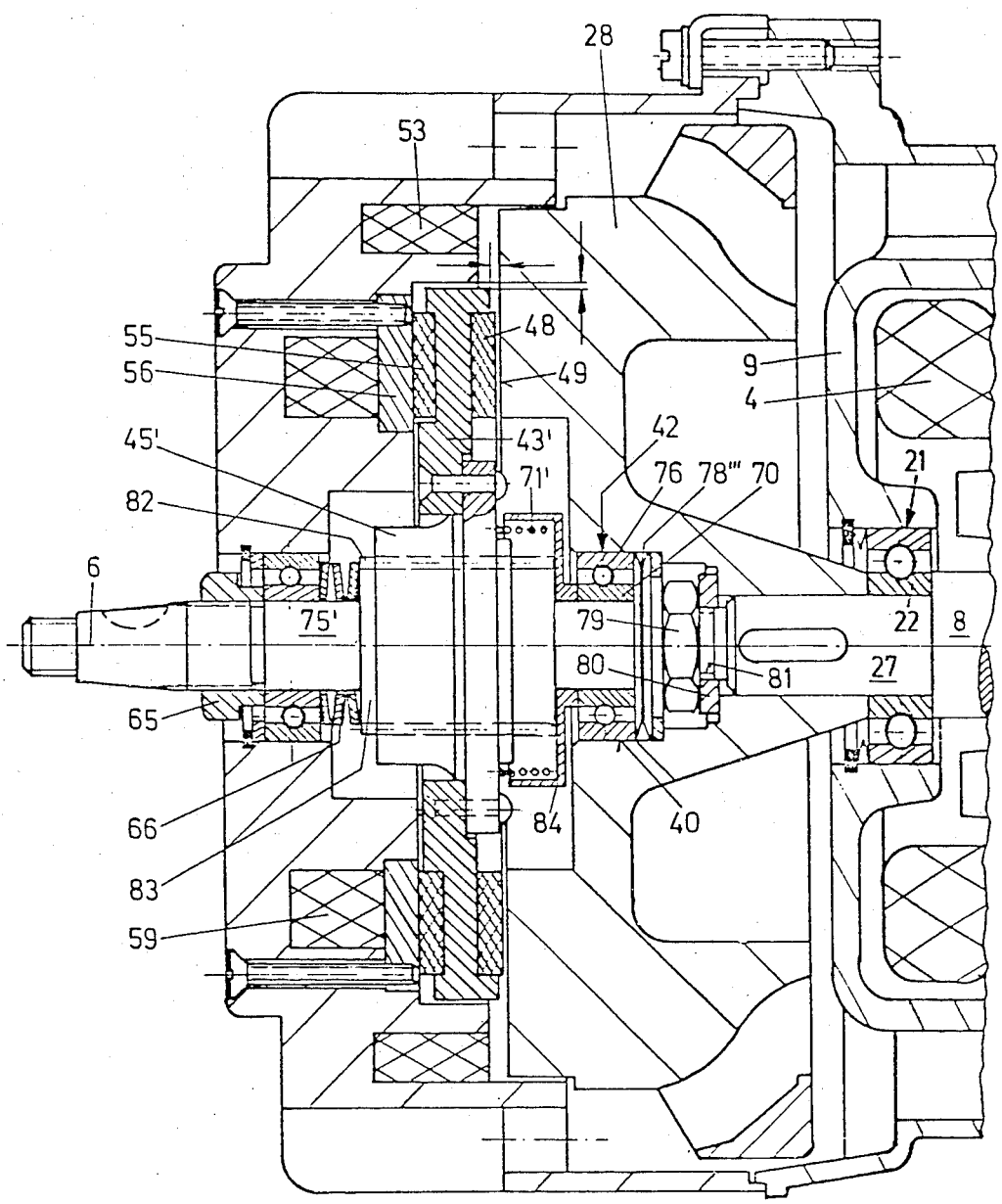
FIG. 3 shows a modified form of embodiment of a clutch/brake unit.

The exemplary embodiment shown in FIG. 3 differs from the exemplary embodiments of FIGS. 1 and 2 in only some respects. For this reason, the same reference numerals are used for the same elements, while the reference numerals for those elements having the same function but a different structure are provided with a prime. A new description of these similar elements will accordingly be omitted.

In the exemplary embodiment of FIG. 3, the disk flywheel 28 is tensed by means of a nut 79 having a shim 80 against the inner ring 22 of the rolling bearing 21, and the nut 79 is threaded onto a threaded tang 81 embodied on the shaft tang 27 of the motor shaft 8. The clutch/brake disk 43' in this embodiment is rigid, and its hub 45' is disposed in a rotationally fixed manner yet axially displaceably on a gear 82 of the driven shaft. An embodiment which is the equivalent of the brake adjustment device 68 of FIGS. 1 and 2 serves as the clutch adjustment device 75', the plate springs 66 being supported axially against a shaft section 83 carrying the gear 82.

The rearward end face of inner ring 70 of the rolling bearing 42 in this embodiment is supported via a support ring 84 against the forward end face of the gear 82. An elastic member 71' is also provided, which rests at a forward end on the support ring 84 and at the rear end on the clutch/brake disk 43'. As a result, the clutch/brake disk 43' necessarily rests at its rear side against the brake support 56, exerting little force, when the clutch coil 53 and the brake coil 59 are not excited. On the forward side of the clutch/brake disk 43', the disk flywheel 28 together with the motor shaft 8 and rotor 7 is axially displaced by a corresponding rotation of the adjusting nut 65, as a result of which the air gap between the clutch lining 48 and the clutch face 49 is adjusted. This embodiment furthermore makes it possible for the readjustment member 78, upon being heated, to perform a corresponding readjustment by displacing the outer ring 76 of the rolling bearing 42 relative to the bearing bore 40, so that—as already discussed above—the disk flywheel 28 is additionally moved, together with the motor shaft 8, relative to the clutch/brake disk 43'.

Figure 4:
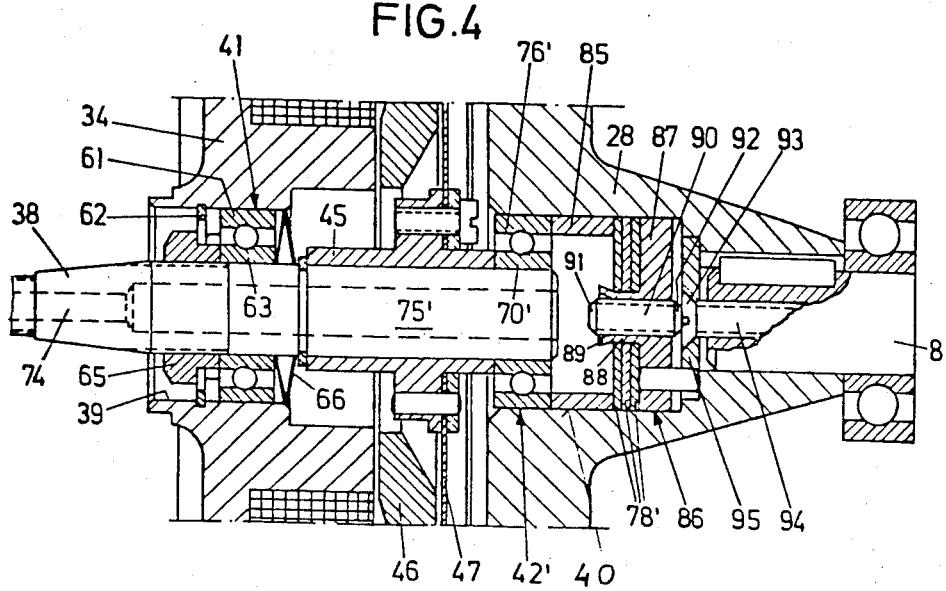
FIG. 4 is a detail, corresponding to FIG. 1, of a modified form of embodiment of the clutch adjustment device.

In a further exemplary embodiment of the clutch adjustment device 75' shown in FIG. 4, it is provided that the inner ring 70' of the rolling bearing 42' does not have a displaceable seat relative to the driven shaft 38, and that the outer ring 76' is disposed with a displaceable seat in the bearing bore 40 and is connected via a spacer ring 85 with the readjustment member 78'. The readjustment member 78' includes bimetallic disks, which are seated on a pressure piece 86. The pressure piece 86 includes a basic body 87, on which the bimetallic disks rest, and a rearwardly extending hub-like protrusion 88, which passes through the bimetallic disks. The free end 89 of protrusion 88 is bent radially outward to secure the bimetallic disks. The protrusion 88 and the basic body 87 are pierced by a threaded bore, which receives a bolt-like adjusting screw 90 having an adjustment slit 91, the free forward end 92 of which rests on the head 93 of the fastening screw 94. The disk flywheel 28 is connected via the disk 95 with the motor drive shaft 8 by means of the fastening screw 94. By actuating the adjusting screw 90, it is thus possible to adjust the axial gap "a," by adjusting the motor drive shaft 8, together with the disk flywheel 28, axially relative to the driven shaft 38. The basic concept such as has been described above in connection with FIGS. 1 and 2 remains unchanged, except for the above-described modifications.

Figure 5:
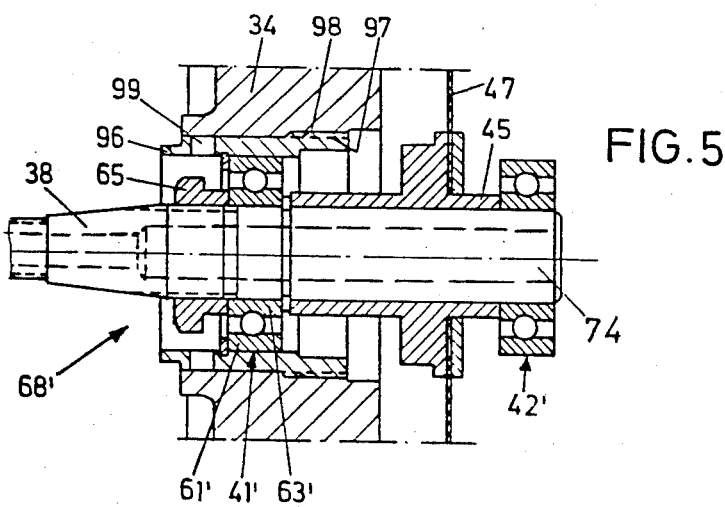
FIG. 5 is a detail, corresponding to FIG. 1, of a modified form of embodiment of the brake adjustment device.

In a modified form of embodiment of a brake adjustment device 68 shown in FIG. 5, the adjustment is effected not via the adjusting nut 65, which here serves solely as a means of axial fastening, but rather via an adjusting sheath 96. The adjusting sheath 96 has a radially outer thread 97, which engages the inside of a threaded bore 98 of the brake bearing bracket 34. The rolling bearing 41' has a fixed seat, with its inner ring 63', on the driven shaft 38, while the outer ring 61' is connected with the adjusting sheath 96 via a displaceable seat. A rotation can be effected, using a slender tool, via bores 99 of the adjusting sheath 96. As a result, an axial adjustment of the driven shaft 38 is attained relative to the brake bearing bracket 34.

Figure 6:
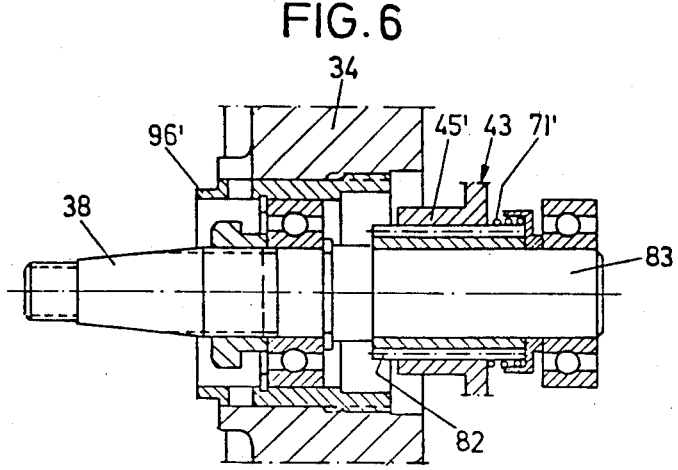
FIG. 6 is a detail, corresponding to FIG. 3, of a modified form of embodiment of a clutch adjustment device.

A form of embodiment shown in FIG. 6 corresponds in its basic structure to the form of embodiment of FIG. 3; in FIG. 6, a rigid clutch/brake disk 43 is disposed in an axially displaceable manner on a gear 82 of the driven shaft 38. The axial displacement of the hub 45', however, is effected in this embodiment via an adjusting sheath 96 in a manner analogous to the form of embodiment of FIG. 5.

Figure 7:
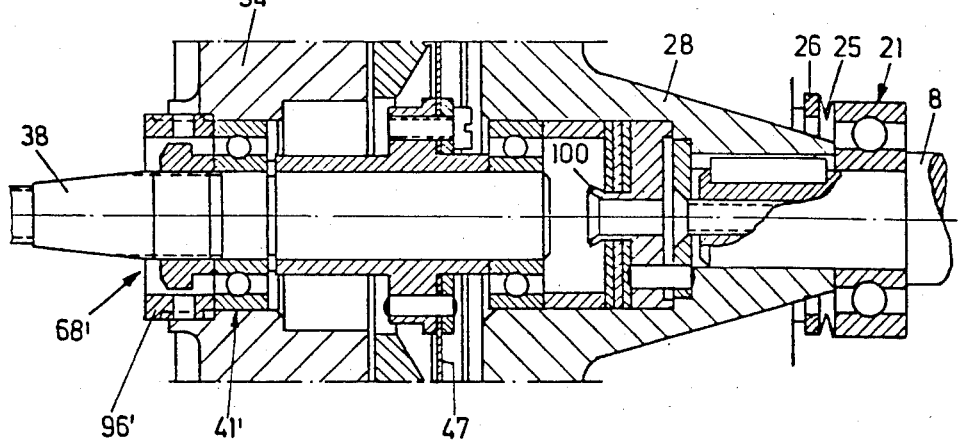
FIG. 7 shows a further form of embodiment of a clutch adjustment device.

In a further form of embodiment, shown in FIG. 7, in which separate adjustment of the clutch and the brake is not provided, the adjustment device is realized in a manner identical to that of FIG. 5, and the transitional zone between the motor drive shaft 8 and the driven shaft 38 is embodied in accordance with FIG. 4; however, in contrast to this, the driven shaft 38 does not have any bore 74, and instead of the adjusting screw 90 a fixed rivet 100 is provided. An adjustment of the clutch play can thus be undertaken via the adjusting sheath 96' in cooperation with the forces of the annular springs 17 and the elastic spider 47. In order to assure satisfactory functioning of the brake independently of the clutch adjustment in this embodiment, the spring force dimensioning of the spider 47 must be designed such that an axial bending of this element of up to 1 mm can be effected, while taking into consideration the torque to be transmitted, yet without any notable change occurring in the torque to be exerted at the driven shaft 38 when the brake lining comes into contact with the brake support 56. This is particularly important in enabling the free adjustment of the sewing machine hand wheel when the brake coil 59 is switched off.

The last form of embodiment described above is distinguished by being particularly economical both in terms of its manufacture and in servicing it.

It is to be understood that the foregoing text and drawing relate to embodiments of the invention given by way of example but not limitation. Various other embodiments and variants are possible within the spirit and scope of the invention.

What is claimed is:

1. An electromotive control device for a sewing machine comprising:
   a motor comprising a housing, a rotor and a stator, said motor being capable of continuous drive, a driven output shaft, and a clutch/brake unit selectively interconnecting said motor and said drive shaft, said clutch/brake unit comprising an axially resilient single clutch/brake disk, and
   hub means to fix said clutch/brake disk to said driven shaft, said clutch/brake disk comprising clutch means for effecting a clutch function,
   said clutch means being formed by a clutch face of a disk flywheel fixed to the rotor of said motor and normally positioned with an air gap relative to said clutch/brake disk, said driven shaft and said clutch means being axially interconnected with one another with said clutch means being axially displaceable relative to said clutch/brake disk, to adjust the size of said clutch air gap, by clutch adjustment means actuatable through a bore in the driven shaft, said bore extending through said hub means,
   said clutch adjustment means including a threaded bore and an adjusting screw, one end of which acts to move the rotor of said motor,
   said single disk further comprising brake means adapted to frictionally contact a fixed portion of said drive to brake the motion of said output shaft, and separate clutch coil means and brake coil means for individually operating said single disk to operate the brake and the clutch of said drive.

2. A drive mechanism as defined by claim 1, characterized in that
   the motor includes a rotatable shaft coupled with said rotor, and
   the clutch adjustment means has elastic member means for acting counter to the hub of the clutch/brake disk.

3. A drive mechanism as defined by claim 2, said adjusting screw having a head which protrudes beyond a support to move the motor shaft and rotor.

4. A drive mechanism as defined by claim 2, wherein the free end of the adjusting screw is supported in the vicinity of an end face of the motor shaft.

* * * * *